United States Patent [19]

Fink et al.

[11] Patent Number: 4,649,650
[45] Date of Patent: Mar. 17, 1987

[54] NUCLEAR REACTOR FUEL ASSEMBLY GRID MEASURING METHOD AND DEVICE

[75] Inventors: David J. Fink, Pittsburgh; Frank W. Cooper, Jr., Monroeville Boro, both of Pa.

[73] Assignee: Westinghouse Electric Corp., Pittsburgh, Pa.

[21] Appl. No.: 730,217

[22] Filed: May 3, 1985

[51] Int. Cl.4 .............................................. G01B 7/14
[52] U.S. Cl. ................................. 33/143 L; 33/1 M; 33/147 N
[58] Field of Search ............ 33/143 L, 147 K, 147 N, 33/178 E, 143 R, 1 M, 503, 556, 286

[56] References Cited

U.S. PATENT DOCUMENTS

| 3,066,969 | 12/1962 | Camac | 294/66 |
|---|---|---|---|
| 3,226,833 | 1/1966 | Lemelson | 33/143 L |
| 3,500,547 | 3/1970 | Van Haagen | 33/143 L |
| 3,649,820 | 3/1972 | Totsuka et al. | 33/143 L |
| 3,719,560 | 3/1973 | Mayers et al. | 176/78 |
| 3,781,997 | 1/1974 | Pagella et al. | 33/143 L |
| 3,793,775 | 2/1974 | Ishikawa et al. | 33/147 N |
| 3,844,047 | 10/1974 | Carson | 33/147 N |
| 3,967,382 | 7/1976 | Johnson et al. | 33/125 R |
| 4,005,528 | 2/1977 | Albertazzi | 33/556 |
| 4,024,646 | 5/1977 | Griggs | 33/143 L |
| 4,048,009 | 9/1977 | Weilbacher | 33/551 |
| 4,186,491 | 2/1980 | Shawke | 33/143 L |
| 4,195,411 | 4/1980 | Gerkey | 33/143 L |
| 4,335,517 | 6/1982 | James et al. | 33/143 L |
| 4,395,005 | 7/1983 | Ganssle | 33/286 |
| 4,437,239 | 3/1984 | Possati | 33/143 L |
| 4,562,648 | 1/1986 | Danielli | 33/143 L |

Primary Examiner—Willis Little
Attorney, Agent, or Firm—L. A. DePaul

[57] ABSTRACT

A nuclear reactor fuel assembly grid measuring method and device, including a grid measuring tool mounted on an X, Y, X positioner having a force limiter for each of these three axes and a grid clamping tool. The grid measuring tool is a combination of: a movable, spring-loaded, caliper assembly; a caliper stand assembly; and a base assembly. TV cameras are mounted on the base assembly to allow remote viewing and positioning of the caliper assembly and monitoring of the overall measuring process. An additional separate force limiter is provided near the caliper assembly to prevent excessive force from being applied to the delicate fuel assembly grids. Measurements are taken only after the caliper assembly is positioned upon the grid. Finally, a linear variable differential transformer is associated with the caliper assembly for enhancing accuracy of the measurements.

16 Claims, 7 Drawing Figures

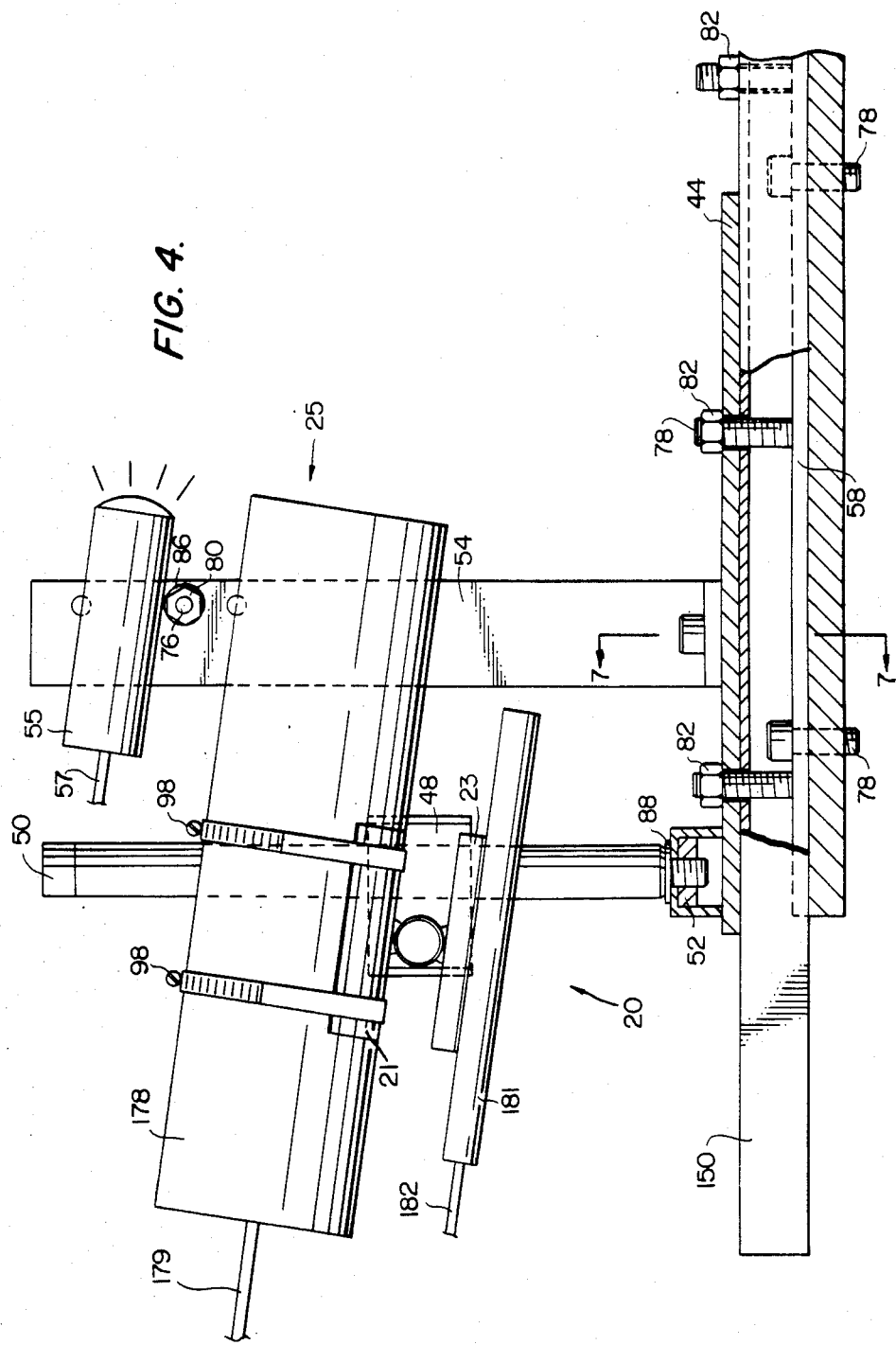

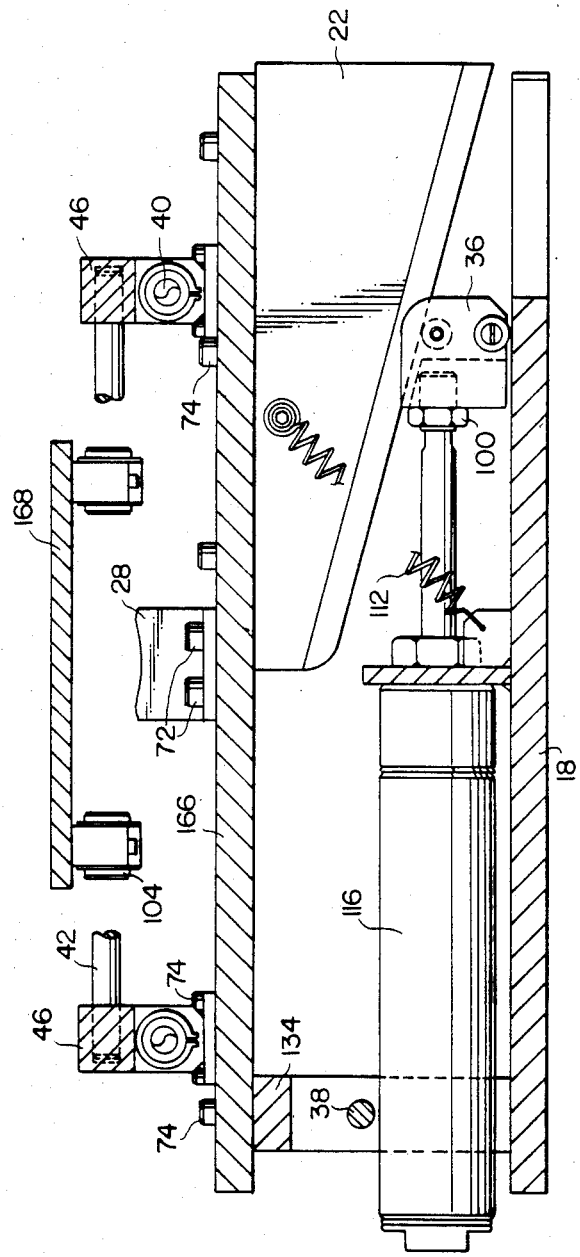
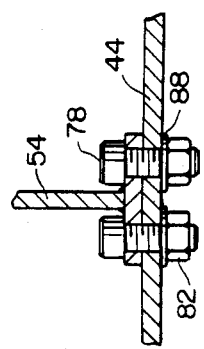

NUCLEAR REACTOR FUEL ASSEMBLY GRID MEASURING METHOD AND DEVICE

BACKGROUND OF THE INVENTION

This invention relates to measuring methods and devices and, more particularly, to a method and device for remotely measuring irradiated nuclear reactor fuel assembly grids.

DESCRIPTION OF THE PRIOR ART

Conventional nuclear reactor fuel assemblies include a multiplicity of fuel rods and control rod guide thimbles held in an organized array by "grids" spaced along the fuel assembly length. See, for example, co-owned U.S. Pat. No. 3,719,560, issued to MAYERS et al., for a general discussion of nuclear reactor fuel assembly grids.

Fuel assembly grids have traditionally been made of an alloy known as INCONEL, mainly because of this alloy's strength and corrosion resistance. Unfortunately, INCONEL absorbs neutrons which, ultimately, reduces fuel efficiency. On the other hand, a zirconium alloy, known as ZIRCALOY, is characterized by a very low absorption of neutrons and is currently being used to make the grids. However, ZIRCALOY expands when it is irradiated.

Knowledge of the exact amount of ZIRCALOY expansion is critical to the proper spacing of the fuel assemblies in the reactor core and, ultimately, to the proper operation of the nuclear reactor. However, due to the high radiation field in a nuclear reactor fuel assembly region, taking accurate measurements of a ZIRCALOY fuel assembly grid during operation has been extremely difficult. As a matter of fact, actual grid expansion has not yet been accurately measured.

In light of the above discussion, it is clear that a need still exists for a nuclear reactor fuel assembly grid measuring method and device which can remotely and efficiently measure an irradiated fuel assembly grid.

SUMMARY OF THE INVENTION

It is, therefore, an object of the present invention to provide a nuclear reactor fuel assembly grid measuring method and device capable of remotely and accurately measuring the true dimensions of an irradiated fuel assembly grid.

It is another object of the present invention to provide a nuclear reactor fuel assembly grid measuring method and device, wherein the device can be moved in the X, Y and Z axes, but wherein force limiting means are provided to limit movement in each of these axes to prevent damage to the fuel assembly.

It is another object of the present invention to provide a nuclear reactor fuel assembly grid measuring method and device capable of remotely measuring ZIRCALOY grid expansion, while the fuel assembly remains submerged in a spent fuel storage pit.

Finally, it is an object of the present invention to provide a nuclear reactor fuel assembly grid measuring method and device using TV cameras to remotely position the device and to monitor the measuring process.

To achieve the foregoing and other objects of the present invention, and in accordance with the purposes of the invention, there is provided a nuclear reactor fuel assembly grid measuring method and device, including a grid measuring tool mounted on an X, Y, Z positioner having force limiting means for each of these three axes and a grid clamping tool. The grid measuring tool is a combination of: a movable, spring-loaded, caliper assembly; a caliper stand assembly; and a base assembly. TV cameras are mounted on the base assembly to allow remote viewing and positioning of the caliper assembly and monitoring of the overall measuring process. An additional, separate force limiting means is operatively connected to the caliper assembly to prevent excessive force from being applied to the delicate fuel assembly grids. Measurements are taken only after the caliper assembly is positioned upon the grid. Finally, a linear, variable differential transformer is operatively connected to the caliper assembly for enhancing accuracy of the measurements.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a partial, cross-sectional, side view of the grid measuring device of the present invention, illustrating particularly the cradle assembly including two TV cameras and a light;

FIG. 6 is a partial, cross-sectional, front view of the grid measuring device of the present invention shown in FIG. 3, taken along line 6—6; and FIG. 7 is a partial, cross-sectional, front view of the grid measuring device of the present invention shown in FIG. 4, taken along line 7—7.

DESCRIPTION OF THE PREFERRED EMBODIMENTS

Figure 1:
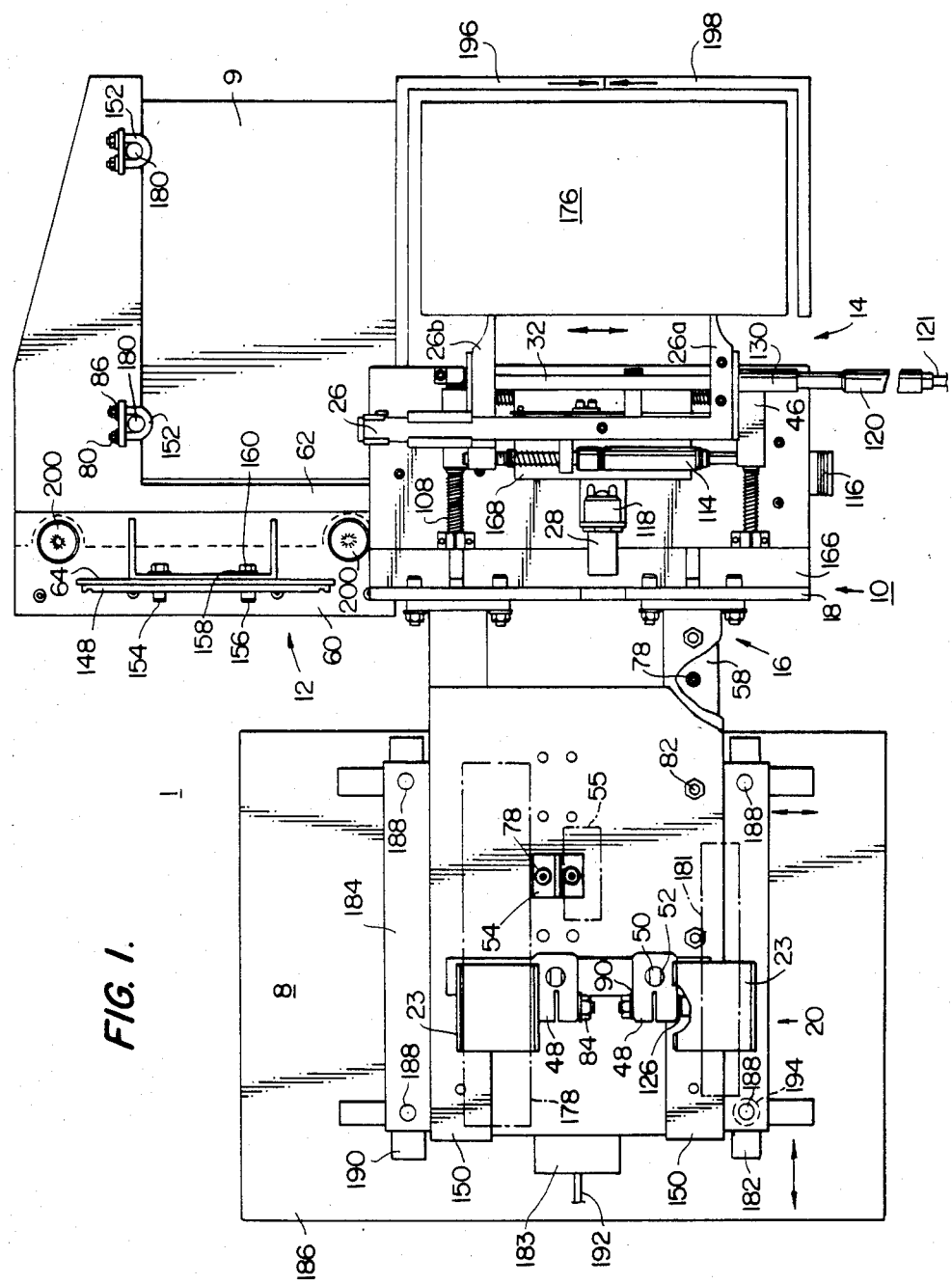
FIG. 1 is a top, plan view of the grid measuring device of the present invention, illustrating particularly the grid measuring tool mounted on the X, Y, Z positioner and connected to the grid clamping tool.

FIG. 1 is a top plan view of the preferred embodiment of the grid measuring device of the present invention, indicated by reference numeral 1, as the device would be used in a spent fuel storage pit (not shown). The grid measuring device 1 basically comprises a grid measuring tool 10, an X, Y, Z positioner 8 and a conventional grid clamping tool 9.

Figure 2:
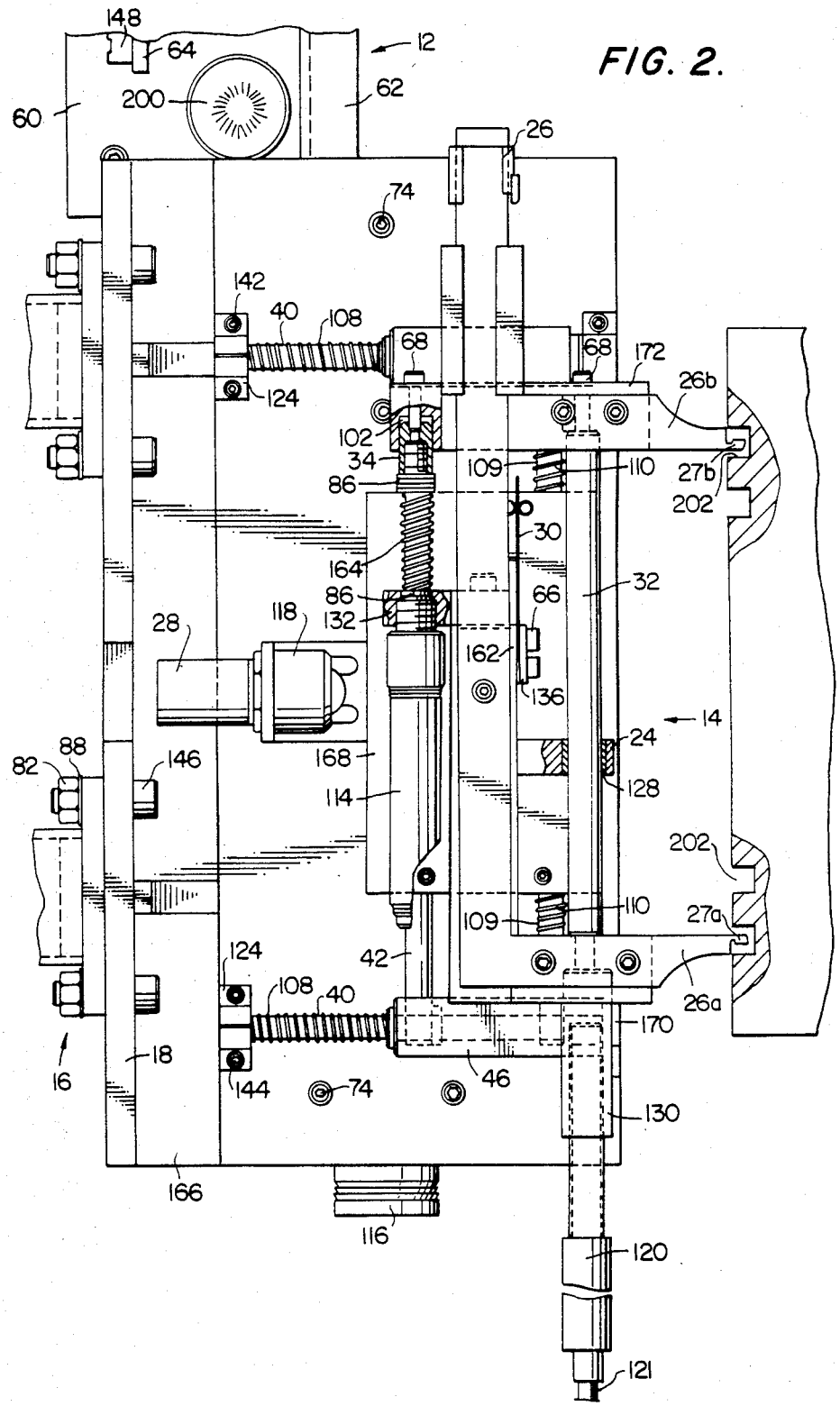
FIG. 2 is a partial, top view of the grid measuring device of the present invention, illustrating particularly the caliper assembly, which is mounted on the caliper stand assembly, engaging a grid for measurement.
Figure 3:
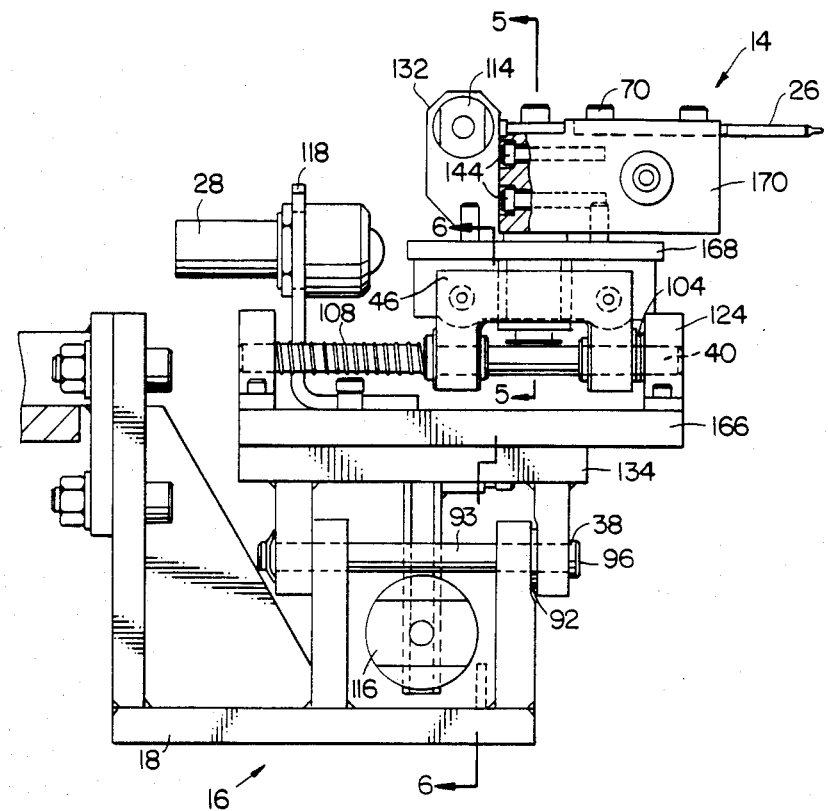
FIG. 3 is a partial, side view of the grid measuring device of the present invention, illustrating particularly the relationship of the caliper assembly, the caliper stand assembly and the base assembly.

As best shown in FIGS. 1-3, the grid measuring tool 10 generally includes a caliper stand assembly 12, a caliper assembly 14 and a base assembly 16. The base assembly 16 generally includes a base weld mount 18 and a cradle assembly 20.

More paticularly, the caliper stand assembly 12 comprises a caliper stand 60 attached to a locator plate 62. The locator plate 62 has U-bolts 152 attached thereto by, e.g., hex nut 80/washer 86 combinations. The U-bolts 152 attach to the grid clamping tool 9 via members 180. A backup plate 64 and a gauge plate 148 are attached to the caliper stand 60 by, e.g., lock washer 160/hex nut 158/bolt 154, 156 combinations.

As best shown in FIG. 2, the caliper assembly 14 comprises a housing 46 connected to a swivel base 170 by bolts 70. The housing 46 is connected to a caliper bracket 172. A caliper 26, containing two opposing caliper jaws 26a and 26b, is slidingly received by the caliper bracket 172 near the front of the caliper assembly 14. The caliper jaw 26a is movable relative to the caliper jaw 26b. Each of the nibs or free ends 27a and 27b of the caliper jaws 26a and 26b, respectively, is configured to receive slots 202 formed in each grid 176, which will be discussed more fully hereafter. The caliper assembly 14 also includes an engaging rod 32 which extends through a guide 24 via a bushing 128. The guide 24 is connected to the caliper 26. The engaging rod 32 is attached at one end of the caliper assembly 14 to the caliper bracket 172 by, e.g., a bolt 68. The engaging rod 32 is responsible for moving the movable caliper jaw 26a relative to the caliper jaw 26b. The caliper assembly 14 further includes a backup plate 136 attached to the caliper 26 by, e.g., bolts 66. Between the backup plate 136 and the caliper 26 there are located a gasket 162 and a spring 30.

The entire caliper 26 is spring mounted to the base assembly 16. That is, the caliper assembly 14 comprises at the top and bottom, shafts 40 which receive compression springs 108. The shafts 40 are attached to the swivel base 170 by, e.g., shaft hangers 124 and bolts 142 and 144. In addition, at the front of the caliper assembly 14 there are located shafts 109 which receive compression springs 110. At the back of the caliper assembly 14 there are located a shaft 42 and a cylinder 114. The cylinder 114 receives at one end a compression spring 164, washers 86, a rod extension 34, a washer 102 and a bolt 68.

Because of the accuracy required for grid analysis, an electronic measurement of the distance of interest has traditionally been difficult, if not impossible. The present invention solves this problem by measuring only the incremental distance from a known starting point. That is, at one end of the engaging rod 32, there is connected a linear variable displacement transformer 120 and an LVDT housing 130. The LVDT 120 has a total travel of approximately $+/-0.5''$. A calibration standard is located on a base table 168, which is accessible anytime during the measurement process.

As discussed above, the caliper assembly 14 is mounted on the base assembly 16. This base assembly 16 is designed to allow fine adjustments to the alignment of the caliper 26 relative to the grid 176.

As shown in FIGS. 1, 4 and 7, the base assembly 16 generally comprises a base weld mount 18 connected to a cradle assembly 20. A stud plate 58 and a pair of channel weld mounts 150 are fixedly connected to the base weld mount 18 by, e.g., hex nut 82/lock washer 88/bolt 146 combinations.

The cradle assembly 20 supports the visual system 25 of the present invention, i.e., a light 55 and cameras 178 and 181. A light bracket 54 and a camera base 44 are attached perpendicularly relative to the stud plate 58 by, e.g., bolt 78/hex nut 82/lock washer 88 combinations. The light bracket 54 receives the light 55 by, e.g., bolt 76/hex nut 80/washer 86 combinations. An electrical connection 57 extends from the light 55. The camera base 44 includes a pair of shafts 50 connected thereto by, e.g., nuts 52. The shafts 50 also extend perpendicularly from the camera base 44 and receive an adjustable clamp 48 having hex nut 84/washer 90/lock washer 126 combinations and hose clamps 98.

The cradle assembly 20 may include two separate cradles 21 and 23 connected to the clamp 48. The top cradle 21 receives the underwater camera 178 thereon. The camera 178 is primarily a cylindrical tube, about 2'' in diameter and 14'' to 16'' long, having a cable 179 extending therefrom. The second cradle 23 receives the second underwater camera 181 having a cable 182 extending therefrom. The second camera 181 has a diameter of about 1¼'' and is about 8-10'' long. Either or both of these cameras 178 and 181 can be used with the present invention, although the preferred embodiment contemplates use of both cameras.

The base assembly 16 also includes the base table 168 and a tilt table 166. Extending along the rear length of the base table 168 is the hydraulic cylinder 114 which is received by a cylinder bracket 132. The cylinder bracket 132 is connected to the housing 46 by, e.g., bolts 144. The housing 46 is rotatable about shaft 40 mounted in the shaft hangers 124 via ball bushings 104. The swivel base 170 and caliper 26 are mounted on top of the base table 168 and the housing 46.

FIGS. 1 and 3 best illustrate the primary force limiting means of the present invention which protects the nuclear reactor fuel assembly from potentially damaging lateral forces. More particularly, a ball cam valve 118 is mounted on a bracket 28 ascending perpendicularly from the tilt table 166. The braket 28 is attached to the tilt table 166 by, e.g., bolts 72. This ball cam valve 118 acts as a force limiting switch valve. Therefore, lateral forces are limited by the movement of the base table 168, against the compression springs 108, causing the activation of the ball cam valve 118 and causing the disengagement of the grid measuring tool 10 from the grid 176.

Figure 5:
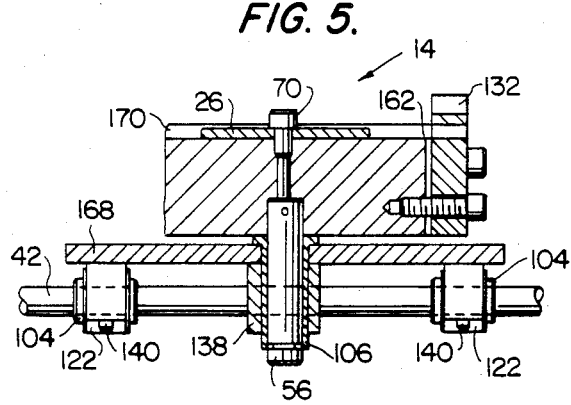
FIG. 5 is a partial, cross-sectional, side view of the grid measuring device of the present invention shown in FIG. 3, taken along the line 5—5.

FIG. 5 is another view illustrating more clearly the relationship of the caliper assembly 14 and the base table 168. As can be seen, the base table 168 can rotate on shaft 42 via the ball bushings 104 located in the bushing mounting brackets 122 connected by, e.g., bolts 140 and the bushing mounting bracket 138 including the bushing 106 and a swivel pin 56. In addition, the caliper assembly 14, including the caliper 26, is located on the swivel base 170, which attaches to the base table 168.

As best shown in FIGS. 5 and 6, the base assembly 16, which is connected to the caliper stand assembly 14, includes the base weld mount 18 which rotatably supports a lug bracket 134 by, e.g., a clevis pin 38/retainer 96/thrust washer 92/shaft 93 combination. A second hydraulic cylinder 116 is mounted to the base weld mount 18 via a clevis assembly 36. Between the cylinder 116 and the clevis assembly 36 there is attached a jam nut 100. Above the cylinder 116 there is located a plate 22 which is biased relative to the base weld mount 18 via an extension spring 112. The tilt table 166 is mounted to the plate 22 and the housing 46 is mounted to the tilt table 166 by, e.g., bolts 74. The ball cam valve bracket 28 is connected to the tilt table 166 by, e.g., bolts 72. Extending from one end of the housing 46 to the other end is the shaft 42 for receiving the base table 168 via ball bushings 104. In addition, the shafts 40 extend perpendicularly relative to shaft 42 through the housing 46.

As shown in FIG. 1, the grid measuring tool 10 is mounted on the X, Y, Z positioner 8 which is capable of translation in the X, Y, Z axes. X, Y, Z positioners are known in the art. However, the X, Y, Z positioner 8 of the present invention is modified to include a unique manifold means 183 having built-in relief valves for limiting movement in each of the three axes. More particularly, the manifold means 183 mounts on the base plate 186 of the X, Y, Z positioner 8. Control lines 192 extend into the manifold means 183 and connect with conventional relief valves, i.e., simple, spring-loaded, check valve-type relief valves (not shown). Accordingly, each circuit can be short-circuited by a relief valve to create the limiting protection needed. In summary, the X, Y, Z positioner 8 of the present invention is modified with manifold means 183 to provide force limiting protection, a feature which the conventional X, Y, Z positioner does not have.

The X, Y, Z positioner 8 of the present invention also is modified to include a hydraulic-actuated, locking, piston collet as a Z-axis brake 194.

In addition to the protection afforded by the manifold means 183, the ball cam valve 118, discussed above, is a redundant protection for forward movement only of the caliper 26. Even though the ball cam valve 118 is redundant, it is actually the primary force limiter of the invention. The relief valves of the manifold means 183 are the secondary force limiters. Accordingly, this invention is capable of effectively limiting its force in three axes to prevent damage to the fuel assembly grids 176.

The present invention also uses a conventional temperature probe (not shown) to detect the temperature of the water in the spent fuel storage pit during operation of the grid measuring device 1.

The grid measuring tool 10, except for the locator plate 60 which is off to the side, is mounted on the translating table 184 of the XYZ positioner 8. The entire grid measuring tool 10 moves as a unit on the X, Y, Z positioner 8. Located underneath the translating table 184 is the base plate 186 of the X, Y, Z positioner 8. Four rods 188 are provided ascending from the base plate 186 to the translating table 184 to form what is known in the art as a "Z-axis tower". The translating table 184 rides up and down on the Z-axis tower. The bottom of the Z-axis tower translates on a two-directional carriage 190 mounted on the base plate 186. Overall, the X, Y, Z postioner 8 with the Z-axis tower delivers the caliper 26 to the grid 176, as will now be described.

The X, Y, Z positioner is driven by tap water. The tap water runs through a remote, first control box (not shown), including conventional directional valves, e.g., four-way directional valves, that can control the direction of the X, Y, Z positioner 8, either left/right, in/out, up/down. Essentially, there are six plastic tube lines that run from the first control box to the X, Y, Z positioner 8 about 100' away, which is underwater.

The hydraulic cylinders 114 and 116 of the grid measuring tool 10 are also water driven. The connections for these cylinders 114 and 116 go back to a remote, second control box, i.e., a second control box (not shown). The second control box also controls use of the Z-axis brake 194 discussed above.

As stated above, the grid measuring tool 10 uses a visual system 25, including two cameras 178 and 181 and an underwater light 55. In regard to the connections for the visual system 25, the light 55 connection 179 leads to a variable intensity control. The connections 179 and 182 for the respective cameras 178 and 181, connect to a conventional camera controller (not shown), which controls the focus. The cameras 178 and 181 are ultimately connected to a conventional monitor (not shown).

The cameras 178 and 181 are movable only when the X, Y, Z positioner 8 moves. That is, the cameras 178 and 181 are adjustably mounted on the clamp 48 of the grid measuring tool 10 and, consequently, are prefocused onto the ends 27a and 27b of the calipers—one camera on each end. The camera positions do not have to be changed during operation of the grid measuring device 1.

Finally the electrical connection to the LVDT is, e.g., a simple, shielded-type cable 121, connected to a remote, electrical control box.

In summary, there are basically two hydraulic control boxes, the first one for the X, Y, Z positioner 8 and the second one for the grid measuring tool 10. There is also an electrical control box for both the LVDT and for an electrical cable connected to the temperature probe.

This grid measuring device 1 remotely measures grid expansion while the grids 176 remain submerged in the spent fuel storage pit. That is, with the fuel assembly hanging from a conventional spent fuel handling tool (not shown), the grid measuring device 1 sits on a spent fuel storage rack (not shown).

More particularly, the spent fuel storage pit receives a plurality of honeycombed storage racks. Each storage rack rests on and ascends vertically from the bottom of the spent fuel storage pit. Each fuel assembly, which is about 10' by 9" by 9", is slid down into a storage rack from the top. The X, Y, Z positioner 8 is set on top of the storage racks and the fuel assembly is hung from the conventional spent fuel handling tool partially inside a storage rack to expose a particular grid 176 for measurement. Depending upon what grid 176 one wants to measure, the fuel assembly may be several feet into the storage rack or almost totally into the storage rack, in the case where the topmost grid 176 is being measured.

Because a clearance exists between the storage rack and the fuel assembly, the fuel assembly will not necessarily hang steady, i.e., steady enough for an accurate measurement. Therefore, the locator plate 60 of the grid measuring tool 10 is preferably attached to the grid clamping tool 9 via the U-bolts 152. The locator plate 60 and the grid clamping tool 9 are then lowered in place on top of the storage racks. The fuel assembly is then slid down into the grid clamping tool 9. The grid clamping tool's arms 196 and 198 close on a grid directly below the grid 176 sought to be measured to steady the fuel assembly.

The typical distance between grids 176 is about 24". Accordingly, the locator plate 60 is about 24" lower than the caliper 26. That is, the locator plate 60 is located right on top of the storage racks at the same level as the base plate 186 of the X, Y, Z positioner 8. In fact, the base plate 186 registers on the locator plate 60 via the holes 200.

The X, Y, Z positioner 8 is then used to approach and contact the grid 176 to be measured. As contact is made, the entire caliper assembly 14 is caused to back up against the springs 108 and, eventually, the ball cam valve 118 stops any further forward advancement. As a result, the caliper 26 is held against the grid 176 with a small amount of force at a predetermined position, as will now be described.

As shown in FIG. 2, each grid 176 has a plurality of slots 202 formed therein. The position of the jaws 26a and 26b at contact is between the slots 202. That is, the advancing position is on a "target area," i.e., the flat areas just inside of a pair of slots 202 to be measured. The TV cameras 178 and 181 and the tilt table 166 are used to make any angular adjustment of the caliper assembly 14, if necessary, once contact is made. An additional height adjustment might also be necessary via the X, Y, Z positioner 8 in order to obtain the optimal measuring position. Once in the target area, the Z-axis brake 194 on the X, Y, Z positioner is applied, thus preventing drift in a downward direction.

Once the caliper 26 is in place against the grid 176, the cylinders 114 and 116 are selectively actuated to move the tilt table 166 and to cause the ends 27a and 27b of the caliper jaws 26a and 26b, respectively, to expand outwardly into the slots 202. That is, the jaw 26b first moves outwardly until the end 27b catches the first slot 202. In response, the caliper bracket 172 moves in the opposite direction until the other end 27a catches in another slot 202. More particularly, since the caliper assembly 14 mounts on the tilt table 166, which is spring loaded, the whole caliper assembly 14 has compliance back and forth. So, when the end 27b of the moving jaw 26b is caught in the slot 202, the rest of the caliper assembly 14 continues to slide over, which allows the other end 27a to catch the other slot 202.

Measurement is made as the second caliper jaw 26b moves away from the first caliper jaw 26a by the LVDT 120, which measures distance moved from a fixed point.

Although U.S. Pat. No. 3,719,560, cited above, does not show "slots" formed in the grids, the preferred embodiment of the present invention is directed to measuring grids including slots, which are common in the art. Nevertheless, the present invention is not necessarily limted only to measuring grids with slots. For example, the present invention can also be used to measure a distance between tangs that extend from the top of the grid. Further, this grid measuring device 1 can be used, and in fact has been used, for measuring INCONEL grids to provide performance verification. That is, the present invention has been used to verify that INCONEL grids do not grow, as expected.

Overall, the present invention provides the following advantages over the prior art measuring devices: the caliper jaws are spring mounted; remote positioning (up to 100' away) is made possible by television cameras; close tolerance (+/−0.002") is accomplished; the device can be calibrated between each measurement; underwater measurement (designed for 30' deep) is possible; lateral force limiting means are used during positioning; the Z-direction can be locked in place by a hydraulic actuated collet to prevent drifting; quick and easy changes are available for use of the device on different size fuel assemblies; the device efficiently measures distance between two slots in the face of a fuel assembly grid; one caliper jaw is fixed while the other caliper jaw is movable, which makes possible use of the LVDT; and the device runs on tap water which prevents contamination of the liquid in the spent fuel storage pit.

In addition, unlike conventional measuring devices, which must be carefully held in place while the measurement is being made, the grid measuring device 1 of the present invention is positioned against the grid 176 before any measurement is made. Only then is the caliper 26 actuated and the measurement made. This results in a high degree of accuracy (approximately +/−0.002") and repeatability (approximately +/−0.001").

Overall, the grid measuring device 1 described herein is a distinct improvement over conventional measuring devices because it accurately and remotely measures the true dimensions of a fuel assembly grid 176 up to 100" away.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

We claim:

1. A device for remotely measuring a dimension of a workpiece, comprising:
   (a) first means for measuring the dimension of the workpiece;
   (b) second means for limiting the force exerted by the first means against the workpiece;
   (c) third means connected to the first means for moving the first means in the X, Y, Z axes simultaneously relative to the workpiece;
   (d) fourth means for limiting the force exerted by the third means moving the first means in the X, Y, Z axes; and
   (e) fifth means remote from the workpiece for monitoring and controlling the movement of the first means relative to the workpiece.

2. The device as recited in claim 1, wherein the first means comprises a base assembly connected to the second means, and a caliper assembly mounted for biasing movement on the base assembly, and
   wherein the second means comprises a ball cam valve operatively connected between the base assembly and the caliper assembly.

3. The device as recited in claim 2, wherein the fifth means comprises a television camera mounted on the base assembly.

4. The device as recited in claim 3, wherein the caliper assembly further comprises a linear variable differential transformer.

5. A device for remotely measuring a dimension of a nuclear reactor fuel assembly grid, comprising:
   (a) a movable, grid measuring tool;
   (b) means connected to the grid measuring tool for limiting the force exerted by the grid measuring tool against the fuel assembly grid;
   (c) an X, Y, Z axes positioner connected to the grid measuring tool for moving the grid measuring tool in the X, Y, Z axes simultaneously relative to the fuel assembly grid;
   (d) means for limiting the force exerted by the X, Y, Z axes positioner moving the grid measuring tool in the X, Y and Z axes; and
   (e) means remote from the fuel assembly grid for monitoring and controlling the movement of the grid measuring tool relative to the fuel assembly grid.

6. The device as recited in claim 5, wherein the grid measuring tool comprises a base assembly connected to the X, Y, Z axes positioner, and a caliper assembly mounted for biasing movement on the base assembly, and wherein the means for limiting the force exerted by the grid measuring tool comprises a ball cam valve operatively connected between the base assembly and the caliper assembly.

7. The device as recited in claim 6, wherein the means for monitoring and controlling the movement of the grid measuring tool comprises a TV camera mounted on the base assembly.

8. The device as recited in claim 7, wherein the caliper assembly comprises a linear variable differential transformer.

9. The device as recited in claim 8, further comprising:
(d) a caliper stand assembly connected to the base assembly; and
(e) a grid clamping tool connected to the caliper stand assembly.

10. A method for remotely measuring a dimension of a nuclear reactor fuel assembly grid, comprising the steps of:
(a) moving a grid measuring tool via an X, Y, Z axes positioner to approach the fuel assembly grid to be measured;
(b) remotely monitoring the movement of the grid measuring tool relative to the fuel assembly grid;
(c) controlling the X, Y, Z axes positioner so that the grid measuring tool contacts the fuel assembly grid; and
(d) moving the grid measuring tool so that the dimension of the fuel assembly grid is measured.

11. The method as recited in claim 10 wherein step (c) further comprises the step of:
limiting the force with which the grid measuring tool contacts the fuel assembly grid.

12. The method as recited in claim 11, wherein step (a) further comprises the following step:
limiting the movement of the grid measuring tool in each of the X, Y, Z axes.

13. The method as recited in claim 10, wherein the grid measuring tool comprises:
(i) a base assembly connected to the X, Y, Z axes positioner,
(ii) a caliper assembly mounted for biasing movement on the base assembly, and
(iii) a ball cam valve operatively connected between the base assembly and the caliper assembly for limiting the force exerted by the caliper assembly against the fuel assembly grid.

14. The method as recited in claim 15, wherein step (b) further comprises the step of using a TV camera mounted on the base assembly.

15. The method as recited in claim 16, wherein step (d) further comprises the step of using a linear variable differential transformer.

16. The method as recited in claim 17, wherein the grid measuring tool comprises:
a caliper stand assembly connected to the base assembly, and
a grid clamping tool connected to the caliper stand assembly.

* * * * *